United States Patent
Love et al.

(10) Patent No.: US 9,836,510 B2
(45) Date of Patent: Dec. 5, 2017

(54) IDENTITY CONFIDENCE SCORING SYSTEM AND METHOD

(71) Applicant: Early Warning Services, LLC, Scottsdale, AZ (US)

(72) Inventors: Robin Love, Phoenix, AZ (US); James R. Mortensen, Chandler, AZ (US); Jie He, Naperville, IL (US); Dan Hayden, Mesa, AZ (US); Laura Weinflash, Scottsdale, AZ (US); Jinghong Qi, Austin, TX (US); Robert Hill, Mill Creek, WA (US); James Napier, Phoenix, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 87 days.

(21) Appl. No.: 14/579,894

(22) Filed: Dec. 22, 2014

(65) Prior Publication Data
US 2016/0179806 A1    Jun. 23, 2016

(51) Int. Cl.
*G06F 21/31* (2013.01)
*G06F 17/30* (2006.01)
*G06K 9/62* (2006.01)
*G06Q 40/02* (2012.01)

(52) U.S. Cl.
CPC ........ *G06F 17/3053* (2013.01); *G06F 21/316* (2013.01); *G06K 9/627* (2013.01); *G06K 9/6215* (2013.01); *G06Q 40/02* (2013.01)

(58) Field of Classification Search
CPC ................................................ G06F 21/316
See application file for complete search history.

(56) References Cited

U.S. PATENT DOCUMENTS

| | | | |
|---|---|---|---|
| 9,053,307 B1* | 6/2015 | Johansson | G06F 21/316 |
| 9,070,088 B1* | 6/2015 | Baveja | G06F 21/316 |
| 2003/0055809 A1* | 3/2003 | Bhat | G06F 17/30368 |
| 2006/0156389 A1* | 7/2006 | Brown | G06F 21/552 726/5 |
| 2008/0109870 A1* | 5/2008 | Sherlock | H04L 63/1425 726/1 |
| 2010/0293090 A1* | 11/2010 | Domenikos | G06Q 10/04 705/38 |
| 2011/0131339 A1* | 6/2011 | Brown | G06F 21/6218 709/229 |
| 2012/0226590 A1* | 9/2012 | Love | G06Q 10/10 705/30 |
| 2013/0054433 A1* | 2/2013 | Giard | H04L 67/22 705/34 |

(Continued)

*Primary Examiner* — Jason C Chiang

(74) *Attorney, Agent, or Firm* — Kilpatrick Townsend & Stockton LLP

(57) ABSTRACT

Identity data for an applicant opening a bank account is provided to an ID confidence scoring system. The scoring system accesses a multi-source data management system, using queries that include a base component, a link component and a function component. Data records maintained by the multi-source data management system include header data having identity data elements, with the header data analyzed pursuant to the queries. Queries may also be provided to an entity resolution system having data records organized in data networks, each data network corresponding to a single entity. Query results are used to develop an ID confidence score for applicant identity data.

20 Claims, 4 Drawing Sheets

(56) References Cited

U.S. PATENT DOCUMENTS

| | | | | |
|---|---|---|---|---|
| 2013/0055367 A1* | 2/2013 | Kshirsagar | ............ | G06F 21/32 |
| | | | | 726/6 |
| 2013/0133054 A1* | 5/2013 | Davis | ................. | G06F 21/316 |
| | | | | 726/7 |
| 2013/0276125 A1* | 10/2013 | Bailey | ............... | H04L 63/1433 |
| | | | | 726/25 |
| 2013/0340052 A1* | 12/2013 | Jakobsson | ............... | G06F 21/33 |
| | | | | 726/5 |

* cited by examiner

IDENTITY CONFIDENCE SCORING SYSTEM AND METHOD

BACKGROUND OF THE INVENTION

Verifying the identity of a person is important in many circumstances. As an example, when a person applies to open an account at a bank, the bank will try to confirm the identity of the applicant. If the bank has the true identity, it can check the applicant's name and other identity information against available fraud databases to learn of any past fraudulent activity by the applicant.

Persons intending to use an account for illegal or fraudulent purposes ("fraudsters") often provide an identity that is false or difficult to verify. For example, a fraudster may provide a "synthetic" identity, which may at first glance appear to be legitimate (e.g., a legitimate looking name, address and/or social security number). Since the identity is not real, there may be no reported fraudulent activity associated with that synthetic identity, and the fraudster may thereby escape detection. In other cases, a fraudster may provide a manipulated identity, which may have identity components (e.g., name, address or social security number) that match some or all of another person's actual identity and that, when checked, will reveal no fraudulent activity (assuming that other person has not engaged in any fraudulent activity).

Thus, there is a need for effective ways to determine whether a person, such as an applicant opening an account at a bank, is the person whom they claim to be.

BRIEF SUMMARY OF THE INVENTION

There is provided, in accordance with embodiments of the present invention, a method and system for evaluating identity information provided by an entity, such as a person seeking to open a bank account. Evaluating the identity information may include developing a confidence score for the information, the confidence score reflecting the likelihood that the person is in fact whom they claim to be.

In one embodiment, a method and system for evaluating identity information provided by an entity includes: storing, at a data storage system, a plurality of data records associated with a plurality of different entities, the data records originating from a plurality of data sources and including, for each of at least some of the originating data sources, both header data having one or more identity data elements related to the associated entity and body data having one or more non-identity data elements related to the associated entity; receiving, from a requesting system, identity data provided by an entity in question, the identity data including at least two identity data elements purported to be associated with the entity; accessing, by a scoring system, data records at the data storage system for the at least some of the originating data sources and related to the at least two identity data elements; determining, at the scoring system, an identity confidence score for the identity of the entity in question, the identity confidence based on only the header data of the accessed data records related to the at least two identity data elements; and providing from the scoring system, the determined identity confidence score to the requesting system.

A more complete understanding of the present invention may be derived by referring to the detailed description of the invention and to the claims, when considered in connection with the Figures.

DETAILED DESCRIPTION OF THE INVENTION

Figure 1:
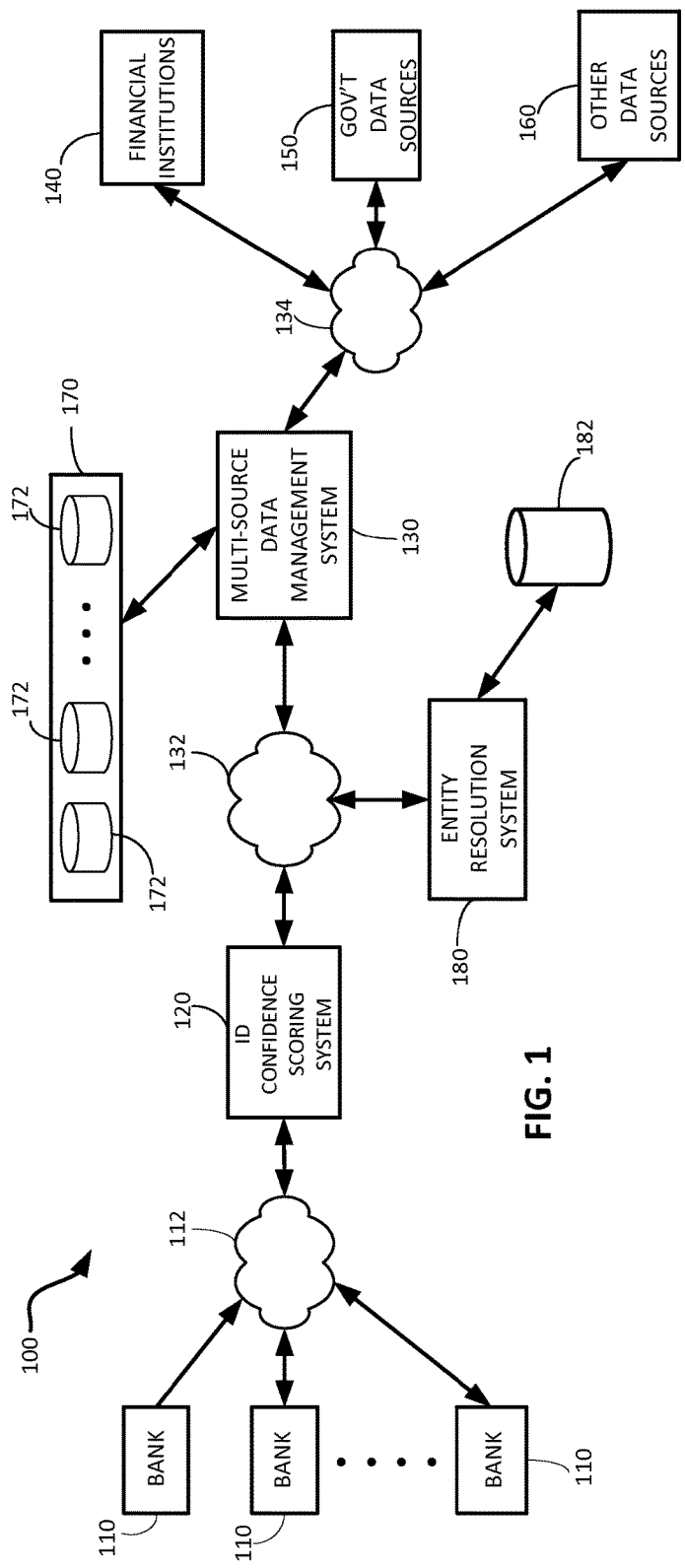
FIG. 1 is a general block diagram showing a network of systems, including an ID confidence scoring system, involved in determining an ID confidence score for an applicant opening an account at a bank.

There are various embodiments and configurations for implementing the present invention. Generally, embodiments provide systems and methods for developing a score that reflects the likelihood that identity information presented by a person is the true identity of that person. In described embodiments, a system is provided for developing a confidence score for an identity used by an applicant applying to open a bank account. The confidence score reflects the likelihood that the applicant is in fact the person whom they claim to be.

In one described embodiment, an applicant opening a bank account provides elements of identity information, such as first name, last name, address, social security number, phone number, etc. The identity information is provided to an ID confidence scoring system, which uses the identity information to develop queries to a database system holding large numbers of data records from many different data sources and each associated with one of many different people. At least some of the data records are formatted to include both (1) record header data, which includes identity data identifying a person (or entity), and (2) record body data for the identified person pertaining to transactions, events, accounts, behaviors, and other things (collectively referred to herein as a "condition") associated with the identified person. As examples only, one such data record may be related to an inquiry received at a bank when a check (written against an account maintained at that bank) is being tendered or deposited at a merchant or different bank, with the record header data including the identity of the person presenting the check (name, phone number, social security number, etc.) and the record body data including the account number, amount of the check, account holder, result of the inquiry (approved/declined), and so forth. Another such data record may be an account status record from one of many contributing banks which provides a periodic status of such account (e.g., perhaps on a daily basis), with the record header data including the identity of the account holder (name, address, phone number, social security number, etc.) and the record body data including the account number, account status (open, closed, etc.), account balance, existence of insufficient funds, stop orders, fraud activity, etc.

In the described embodiment, the results of queries to the database system relate to (and are based on access of) record header data (identity data) in the data records rather than record body data. The query results are then used to develop an ID confidence score. As a simple example, queries to the database system may return data reflecting relationships between the identity elements provided in the query, such as how often each of those provided identity elements appear in the same data record, how often one of the provided data elements appear with other identity elements not provided by the applicant, and so forth.

The results of multiple queries may be combined to create the ID confidence score.

In some embodiments additional steps are taken to create the ID confidence score, such as using an entity resolution system to examine collections of data pertaining to one person or entity (e.g., a collection or group of data records from many different data sources that all appear to relate to a single person or entity) and determining how the identity elements provided by the applicant relate to that collected data.

After an ID confidence score is returned by the ID confidence scoring system, the bank may request fraud data associated with a confirmed identity (where the ID confidence score for the applicant is high) or may request additional identification data from the applicant (when the ID confidence score for the applicant is low).

While described embodiments relate to determining an ID confidence score for a person applying to open a bank account, it should be appreciated that, in other embodiments, an ID confidence score can be determined in many other circumstances where it is desirable to determine or confirm the identity of a person. As examples only, an ID confidence score could be developed for a person applying for a loan, applying for government benefits, purchasing and obtaining title to a car, applying for admission to a school/college, as well as other situations where it is important to determine that a person presenting an identity is in fact the person represented by that identity. It should be further appreciated that embodiments of the invention may also be directed towards determining or confirming the identity of an entity other than a natural person, such as a business entity (e.g., a business entity applying to open a bank account).

Referring now to FIG. 1, a network 100 according to one embodiment of the invention is illustrated. In the network 100, a plurality of banks 110 communicate through a network 112 to an ID confidence scoring system 120 for purposes of receiving from the scoring system 120 an ID confidence score relating to identity data received at one of the banks 110. In the described embodiment, one of the banks 110 receives identity data from a person (applicant) applying to open an account at that bank. As will be more fully described later, the bank 110 provides the identity data to the scoring system 120 in order to evaluate the identity data and receive back an ID confidence score reflecting whether the applicant is in fact the person whom they claim to be.

The ID confidence scoring system 120 develops an ID confidence score based on data managed at a multi-source data management system 130. Such data is accessed by the scoring system 120 through a network 132. The data managed at the data management system 130 will be described in greater detail below, and is received from a plurality of different data sources, including various financial institutions 140 (such as banks), government data sources 150 (such as state driver's license databases, vital statistics records, government real estate and auto title records, census bureau records, Social Security records, etc.), and various other data sources 160. The data sources 160 may represent data collected from many private and public sources that are relevant to a large population of people, their identity, and events or conditions associated with those people (such as check cashing services, credit bureaus, merchant account databases, genealogical records, etc.).

The data management system 130 receives data from the financial institutions 140, government data sources 150 and other data sources 160 through a communications network 134. The data received over network 134 is collected at the data management system 130 and stored at a data storage system 170 that may include one or more data storage devices or memory systems 172.

The network 100 further includes an entity resolution system 180 that accesses data from the data management system 130, and then organizes that data into groups or networks of data that each represent data associated with a single person/entity. The data organized at the entity resolution system 180 is stored in a data storage device or memory system 182. As one example, a system that collects data and organizes that data into data node networks (each data node network having multiple data nodes/records that are all associated with a single person/entity) can be found in U.S. Pat. No. 8,682,764, issued to Love at al., commonly owned with the present application and incorporated herein by reference for all purposes.

The networks 112, 132 and 134 are representative of various kinds of communications networks used for communications between computer-based systems, such as public networks (e.g., the Internet) or dedicated private networks.

Figure 2:
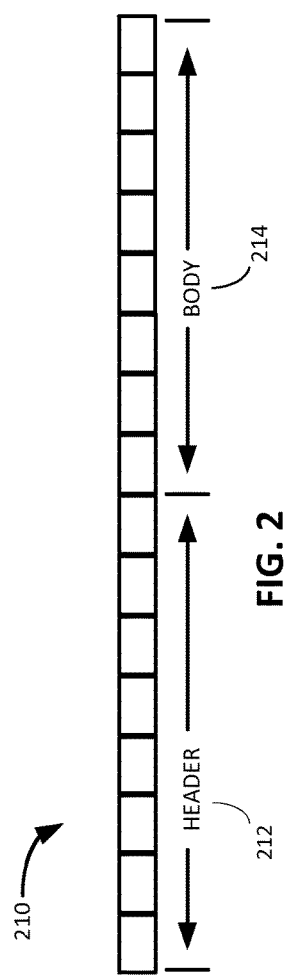
FIG. 2 illustrates one of many data records is used by the ID confidence scoring system seen in FIG. 1 in order to develop an ID confidence score

FIG. 2 illustrates an exemplary data record 210 managed at the data management system 130 and stored within the data storage system 170. While some data records contributed by financial institutions 140, government data sources 150 and other data sources 160 may have only identity data, it is contemplated that most of the data records will have both record header data (identity data) and record body data (account information/status, transactions and other behaviors or conditions pertaining to the associated header/identity data). Thus, as illustrated in FIG. 2, the exemplary record 210 has two portions or segments, namely header data 212 and body data 214. As mentioned earlier, one example of a data record managed at the data management system 130 might be an inquiry record created by a bank when a check (e.g., presented at a bank for deposit or at a merchant for payment) is drawn against an account maintained at that bank. The record header data 212 may represent identity data elements relevant to the inquiry (such as first name, last name, a phone number) provided by the person attempting to tender or deposit the check. In such example, the record body data may represent, among other things, the account against which the check is written (routing number, account number) and the result of the inquiry (check/item declined, check/item approved). Another example of a data record managed at the data management system 130 might be a periodic account status record from a contributing bank, in which case the record header data 212 may represent identity data elements pertaining to the account holder (first name, last name, address, phone number, social security number, etc.) and the record body data may represent account number, account status (open, closed), account balance, and the existence of any insufficient funds notices, stop orders, fraud activity, etc. Other examples of data records maintained by data management system 130 (and stored data storage system 170) are provided later herein.

It should be appreciated that raw records received at the data management system 130 from the data sources 140, 115 160 may have identity data and condition/behavior/event data not arranged into header and body data as disclosed above. The data management system 130 may be configured to arrange the data (either physically or logically) into the record header and record body format as described above for purposes of evaluating that data (by the scoring system 120), in a manner to be described later. In an alternative embodiment, the data management system 130 may strip data records of "body" data and store those "stripped" data records for more efficient access by the scoring system 120.

The following Table I lists examples of identity data elements (and their formats) that could be provided by one of the banks 110 (obtained from an applicant) and that may also be found in header data of data records stored at the data storage system 170 and used by the ID confidence scoring system 120:

TABLE I

| Identity data Element | Example |
|---|---|
| Name | Full Name (First Middle Last); Name Components (Last, First, Middle) |

TABLE I-continued

| Identity data Element | Example |
|---|---|
| Taxpayer Identification Number | Social Security Number (XXX-XX-XXXX); Employer ID Number (XX-XXXXXXX) |
| Phone Number(s) | AC + Number (XXX-XXX-XXXX) |
| Address | Street No., Street Name, City, State, Country, Postal Code (actual spelling or Soundex*) |
| Email Address | Complete email address; Email address components (Prefix1.OptionalPrefix@Suffix.SuffixDomain) |
| Driver's License | Driver's License Number; Issuing State |
| Date of Birth | (MM/DD/YYYY) |

*phonetic representation of Street Name, City, State, Country to accommodate minor differences in spelling or keyboard entry errors; see wikipedia.org/wiki/Soundex.

The following Table II lists examples of data records that could be stored at the data storage system 170:

TABLE II

| Data Record | Description |
|---|---|
| Bank Account Status | Identity data (account holder) and status data (account number, account status, account balance, account fraud/abuse indicators, insufficient funds occurrences, stop payment notices, etc.) |
| Bank Account Owner Data | Identity data (account holder) and various account information |
| Bank Account Abuse | Identity data (account holder) and abuse data (insufficient funds, overdrafts, non-payment of fees, etc.) relating to the account |
| Bank Account Fraud | Identity data (account holder) and fraud data (apparent intentional misuse/criminal activity) |
| Bank Internal Fraud | Identity data (names, social security numbers, addresses, etc.) of bank employees believed to have participated in fraud, and notes concerning the fraud |
| SSN/Name | Identity data (social security numbers and associated names) |
| Descendent Data | Identity data for principals and persons related to principals |
| Incoming Check Returns | Identity data (account holder) and incoming return data (e.g., data received at a bank where a check was presented, from a bank having an account against which the check was drawn) |
| Outgoing Check Returns | Identity data (account holder) and outgoing return data (data sent from a bank having an account against which a check was drawn, to a deposit bank where the check was presented) |
| Check Deposit/Payment Inquiries | Identity data (for the payee on a check) and data for results of inquiry (approved, declined, etc.) |
| Identity Verifications (Checks) | Identity data in identity verifications requested in connection with a check transaction |
| Stop Payments | Identity data and stop payment information in connection with an account |
| ACH Transactions | Identity data and transaction data associated with an ACH transaction |
| Credit Card Owner Data | Identity data (cardholder) and account information relating to a credit card account |
| Credit Card Account Status | Identity data (cardholder) and account information relating to the status of a credit card account |
| Credit Card Account Abuse | Identity data (cardholder) and abuse data related to a credit card account |
| Credit Card Fraud Data | Identity data (cardholder) and fraud data relating to a credit card account |

Figure 3:
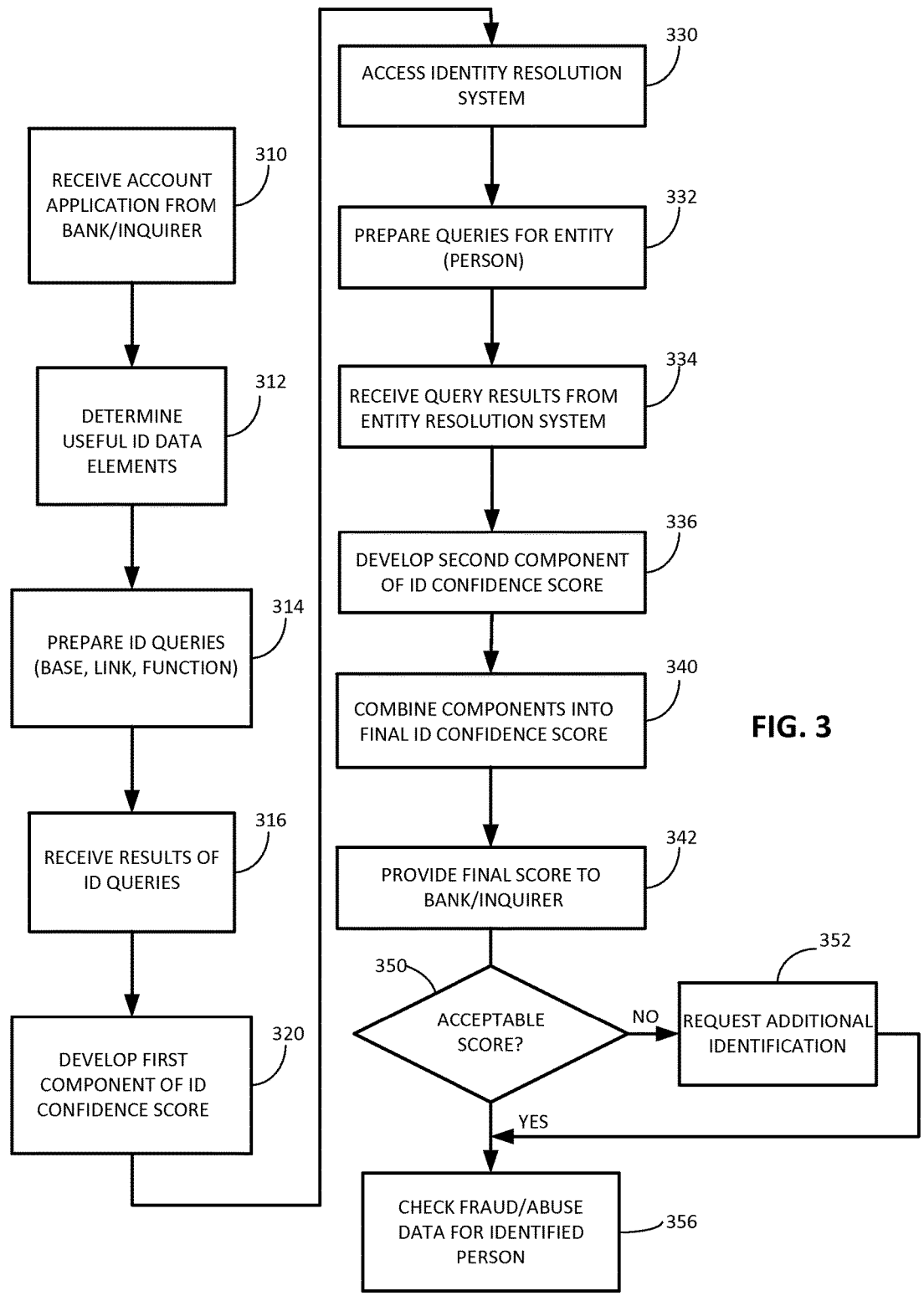
FIG. 3 is a flow diagram illustrating a process implemented at least in part by the ID confidence scoring system seen in FIG. 1.

Turning now to FIG. 3, there is illustrated a process implemented within the scoring system 120 for developing an ID confidence score based on identity data received when a person (applicant) applies to open a bank account at one of the banks 110. The process begins at step 310, with the scoring system 120 receiving account application data from the bank (inquirer), e.g., as part of a request to score identity data. The application data includes various pieces of identity information provided by the applicant, who normally would be the account holder of the bank account to be opened. At step 312, the scoring system 120 parses the application data in order to determine identity data elements that can be used for scoring the identity data provided by the applicant (i.e., providing a score which reflects the likelihood that the applicant is in fact the person/entity that the applicant claims to be).

The scoring system 120 then prepares identity queries (step 314) that are used in analyzing relevant data records stored at the data storage system 170. In accordance with embodiments of the invention, the scoring system evaluates only header data (identity data) contained within the data records at the data storage system 170 that include both record header data and record body data. In preparing appropriate queries at step 314, the scoring system 120 determines, for each query, three query components, namely (1) a base component, (2) a link component and (3) a function component. The base and link components are two different identity data elements for the applicant determined at step 312, and in the described embodiment, each would be one of the identity data elements seen in Table I. The function component is a functional relationship between the base component and link component that is looked for in the data records that are stored within the data storage system 170. Queries are provided to the data management system 134 for processing against data records in the data storage system 170. The results of each query are received (via data management system 130) at the scoring system 120 based on analysis of the data records in the data storage system 170.

The following Table III illustrates function components that may be used within each query:

TABLE III

| Function | Description |
| --- | --- |
| Count | The number of times the specified base component is seen with any link component |
| Unique Count | The number of different link components that are see seen in with a specified base component |
| Days Range | The number of days between the first occurrence of a record where the base and link components both appear and the most recent occurrence of a record where the base and link components both appear |
| Source Count | The number of different data sources where a specified base component appears with any link component |
| Source Match Account | The number of different data sources where a specified base component appears with a specified link component (both base and link in a data source record match those specified in a query) |
| Fraud Count | The number of times a specified base component and specified link component both appear in a fraud data record |
| Abuse Count | The number of times a specified base component and a specified link component both appear in an abuse data record |
| Match Count | The number of times the specified base component is seen with the specified link component in any data record (as will be described later, near matches are included if they have sufficient closeness specified by a matching framework score) |
| Match Last Seen Days | The number of days since the most recent data record in which the specified base component is seen with the specified link component |
| Rate Match Count/Count | The number of times the specified base component is seen with the specified link component, divided by the number of times the specified base component is seen with any link component |
| Maximum Matching Framework Score | In a match count (where the base is deemed an exact match), the highest matching framework score of the matching link (matching framework score will be described in greater detail below) |
| Matching Framework Score of the Most Occurring Link Component | In a match count, the matching framework score of the most frequently occurring data record that has a specified link component |
| Count of Records Contained in Query | In a match count, the number of result records where a link value/component is not an exact match but it has value contained within the specified link value/component of the query (e.g., a result record having "Dan" and the specified link value in the query is "Daniel") |

TABLE III-continued

| Function | Description |
| --- | --- |
| Count of records Containing Inquiry | In a match count, the number of result records where a link component is not an exact match but it has a value that contains the specified link component (e.g., a result record having "Daniel" and the specified link value in the query is "Dan") |
| Last Seen Matching Framework Score | In a match count, the matching framework score of the most recent matching result record |
| First Seen Matching Framework Score | In a match count, the matching framework score of the oldest matching result record |
| Shared Chief (Most Common) Value | In a match count, for result records where the base component is an exact match and the link component is a near match, determine the most commonly appearing link component value. The shared chief value is the number of data records that have different base components associated with the most commonly appearing link component value. |
| Reversal Chief (Most Common) Value | In a match count, for result records where the base component is an exact match and the link component is a near match, determine the most commonly appearing link component value. The reversal chief value is the most commonly appearing base component value associated with the determined most commonly appearing link component value (found in other data records) |
| Miles from Chief (Most Common) Address to Inquiry Address | When a base component matches and when a link component (which is an address) does not match, determine the most commonly occurring address in other data records that appear with the matching base component. This function is the number of miles from the most common nonmatching link (address) to the specified link (address). |
| Miles from Last Address to Inquiry Address | When a base component matches and when a link component (which is an address) does not match, determine the most recent data record having a matching base and the non-matching address. This function is the number of miles from that most recent non-matching address to the specified link component/value (address). |

Returning to FIG. 3, the results of the ID queries are received by the system 120 at step 316 and used to develop a first component of an ID confidence score at step 320. Examples of queries prepared at step 314 and used, in combination, by the ID confidence scoring system 120 to develop a ID confidence score (or a first component of an ID confidence score) will be provided later.

After the first component of the ID confidence score is developed at step 320, the scoring system 120 accesses the entity resolution system 180 at step 330 and prepares queries for a specified person, step 332. As described earlier, the entity resolution system 180 collects data into groups or data node networks, which are stored at storage device 182. Each data node network stored at storage device 182 is associated with a single person or entity. The entity resolution system 180 receives the identity data elements determined at step 312 and finds a data node network that has the closest/best match to those identity data elements. The queries at step 332 are largely directed to that matched data node network (or other closely matched data node networks).

The following Table IV illustrates for queries made at the entity resolution system 180:

TABLE IV

| Query | Description |
| --- | --- |
| Number of First Names | For the closest matching entity, the number of first names that this entity appears to be using |

TABLE IV-continued

| Query | Description |
| --- | --- |
| | as evidenced in the matching data node network |
| Number of Last Names | For the closest matching entity, the number of last names that this entity appears to be using as evidenced in the matching data node network |
| Closeness of Entity | For the closest matching entity, a score for the degree of match/closeness |
| Closeness of Next Closest Entity | For the next closest entity to the matching entity, a score for the degree of closeness |

Closeness of Entity

In one embodiment, this may be a score reflecting the closeness or the degree of match based on a matching framework score, calculated by measuring the distance (closeness) between a representative identity data element (e.g., social security number) for the person specified at step 332 and a corresponding identity data element in the data node network closest to the specified person as determined, e.g., by a matching framework score (or an average distance between the representative identity data element for the specified person and each of the corresponding identity data elements in the data node network).

Closeness of Next Closest Entity

In one embodiment, this may be a score reflecting the closeness of the next closest entity based on a matching framework score, calculated by measuring the distance (closeness) between a representative identity data element for the person specified at step 332 and a corresponding identity data element in the next closest the data node network (or measuring the average distance between the representative identity data element for the specified person and each of the corresponding identity data elements in the next closest data node network).

The results of the queries to the entity resolution system are received at the ID confidence scoring system 120 at step 334 and are used to develop a second component of the ID confidence score at step 336. Those two components are combined at step 340 and a final or complete ID confidence score is provided to the bank/inquirer at step 342. The score provided at step 342 may be a numerical score, say on a scale of 0-100, with 100 reflecting the highest possible confidence and 0 reflecting the lowest possible confidence. The bank receiving that score at step 342 determines whether the score is acceptable for it to proceed with opening an account, step 350.

If the bank (inquirer) determines that score is not acceptable, it may request additional identification from the applicant at step 352 (e.g., requesting tangible identification documents from a trusted source, such as a driver's license, a birth certificate, and so forth).

If the score is acceptable at 350, or if the applicant has provided additional identification at 352 that is sufficient for purposes of opening an account, the bank then uses the verified identity to check, at step 356, fraud or abuse data records relating to the applicant. Such a fraud or abuse records may include records stored at data storage system 170.

Figure 4:
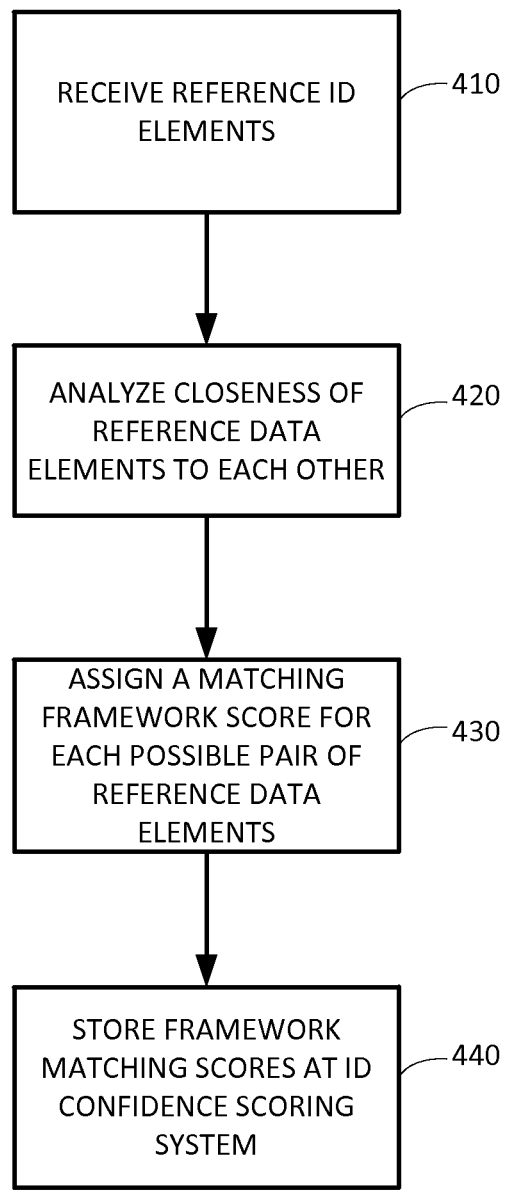
FIG. 4 is a flow diagram illustrating a process for developing framework matching scores that are used in the development of an ID confidence score.

FIG. 4 illustrates a process for developing matching framework scores for various base and link component values used in the queries described above in connection with step 314 (FIG. 3). At step 410, the ID confidence scoring system receives reference ID elements that might appear in various queries. These will be large in number. For example, for each possible data element that represents a first name, variations of that first name will be provided. As a more specific example, if a reference ID element for a first name is "Daniel," the ID confidence scoring system will receive all variations of the first name "Daniel," such as "Dan," "Danny," "Danielle," and so forth. At step 420, the closeness of each reference data element to every other reference data element is analyzed, and a matching framework score for each possible pair of reference data elements is assigned at step 430.

Various methods can be used for establishing the closeness (similarity) for each pair of possible reference data elements at step 420, with one such method being a Levenshtein distance method. Briefly, such a method calculates a "distance" between two terms by calculating the minimum number of single-character edits that are needed to change one term to another term. A further description of such method can be found at wikipedia.org/wiki/Levenshtein_distance. In one embodiment of the invention, the matching framework score may be developed using the Levenshtein distance method along with additional calculations, such as the weighted average of the distance between corresponding data elements of two data records (e.g., when a base component and a link component of a query are deemed to match, the matching framework score of the matching link may be the weighted average distance between corresponding data elements of the data record having the base and of the data record having the link).

It should be appreciated that the scoring system 120 can be programmed to determine that certain words and their common abbreviations (e.g., Joseph and Jos.) and certain words and their first letter (John and J.) can be viewed as exact matches or be assigned, as a pair, a predetermined matching framework score. It should also be appreciated that matching framework scores are not limited to defining the closeness of names of people, but rather can also be used in connection with street names, street numbers, Social Security numbers, phone numbers and so forth.

The result of the analysis at step 420 is a distance (closeness) score which can be a numerical value, say, from 0-100, with for example, 0 being the greatest possible distance between two terms and 100 being an exact match.

Steps 420 and 430 are repeated for every possible pair of reference data elements.

While the process illustrated in FIG. 4 contemplates steps 420 and 430 being performed well in advance (of any calculation of ID confidence scores), it should be appreciated that during the development of an ID confidence score in the process illustrated in FIG. 3 (steps 334 and 336), analyzing and assigning a matching framework score may be accomplished on the fly as new data elements are identified at the ID confidence scoring system 120 (e.g., at step 312) during the development of an ID confidence score. For example, if a new identity element not previously reviewed is received at the scoring system 120 from a bank, such term can be analyzed for closeness to other terms and a matching framework score established for each new pair of terms.

Finally, at step 440, the matching framework scores are stored at the scoring system 124 and are used as new queries are processed at the scoring system 120 for purposes of developing ID confidence scores.

It should be appreciated that in the queries prepared at step 314 (FIG. 3), the bank/inquirer can establish a predefined matching framework score that will be used at the scoring system 120 in order for a match to be determined (i.e., the bank/inquirer will provide a matching framework score to the scoring system 120 in advance, based on its business practices or preferences, and representing the desired degree of closeness or near match for any two terms in order for those terms to be determined as a match). Alternatively, the scoring system 120 can be designed to automatically establish a predetermined framework matching score in order to determine if identity elements are deemed to match (or to be near matches).

The following are examples of queries prepared at steps 314 and 332 in the process of FIG. 3, and used to develop a final ID confidence score at step 340:

Example I

First Component (Query is formatted as [Base]•[Link]•[Function])
Query 1: [TIN]•[PHN]•[Match Count] (the number of times the specified taxpayer identification number is seen with the specified phone number)
Query 2: [PHN]•[TIN]•[Unique Count] (the number of phone numbers seen with the specified taxpayer identification name)
Query 1 has a return result of: 25 (the person with the specified TIN is found 25 times with the specified phone number in accessed examined/data records)

Query 2 has a return result of: 1 (there is only one phone number found in all examined records for the person with the specified TIN)
First Component Score: 90 (0-100, where 0 represents low confidence in the identity data and 100 represents high confidence)

Second Component

Entity Query 1: [NFN] (for the closest matching entity, the number of first names that the specified entity is using)
Entity Query 2: [NLM] (for the closest matching entity, the number of last names that the specified entity is using)
Entity Query 1 has a return result of: 2 (the specified entity has used only two different first names)
Entity Query 1 has a return result of: 1 (the specified entity has used only one last name)
Second Component Score: 90
Complete ID Confidence Score: 90 (represents a high degree of confidence)

Example II

First Component

Query 1: [TIN]•[Name]•[Unique Count]
Query 2: [TIN]•[Name]•[Match Count]
Query 1 has a return result of: 35 (the person with the specified TIN is using 35 different names)
Query 2 has a return result of: 0 (the person with the specified TIN is using a name that is not been seen before in any records)
First Component Score: 5

Second Component

Entity Query 1: [CE] (closeness of matching entity)
Entity Query 2: [CNCE] (closeness of next closest entity)
Entity Query 1 has a return result of: 5 (the closest matching entity is not all that close)
Entity Query 1 has a return result of: 5 (the next closest entity is not all that close and there is not much distinguishing this person from others)
Second Component Score: 5
Complete ID Confidence Score: 5 (represents a low degree of confidence)

Figure 5:
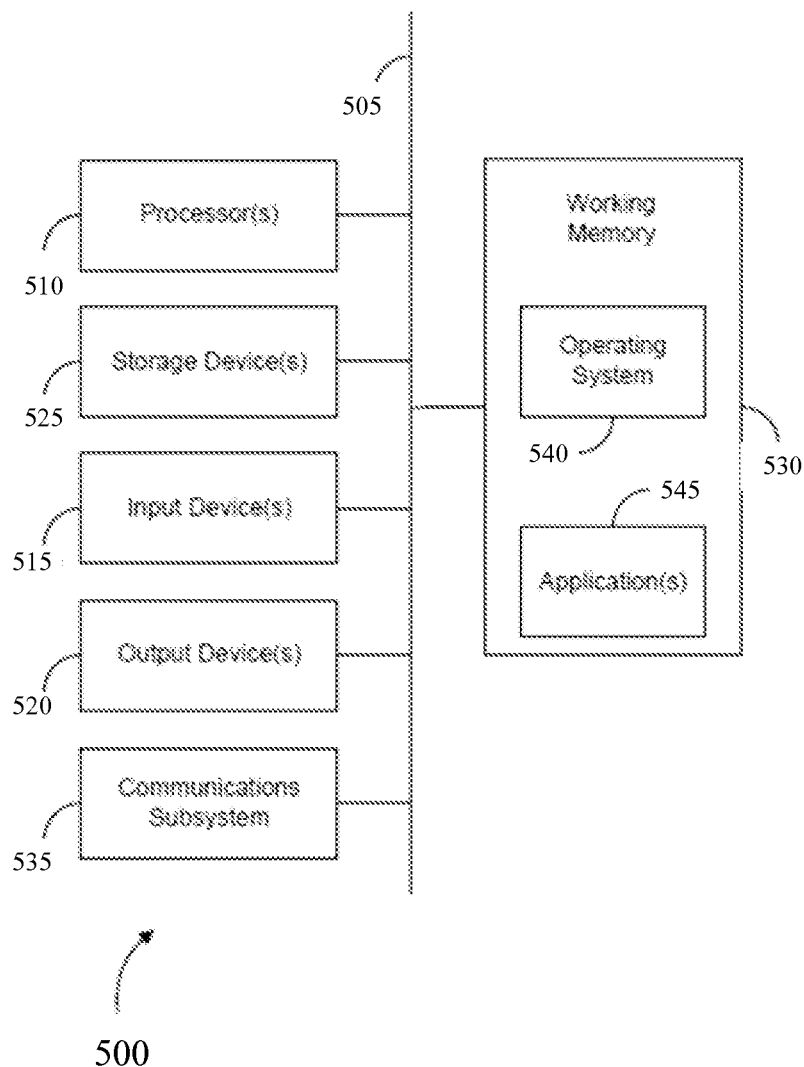
FIG. 5 is a block diagram illustrating an exemplary computer system upon which embodiments of the present invention may be implemented

FIG. 5 is a block diagram illustrating an exemplary computer system upon which embodiments of the present invention may be implemented. This example illustrates a computer system 500 such as may be used, in whole, in part, or with various modifications, to provide the functions of the ID confidence scoring system 120, multi-source data system 130, and entity resolution system 180, as well as other components and functions of the invention described herein.

The computer system 500 is shown comprising hardware elements that may be electrically coupled via a bus 505. The hardware elements may include one or more processing devices (processors) 510, one or more input devices 515 (e.g., a mouse, a keyboard, etc.), and one or more output devices 520 (e.g., a display device, a printer, etc.). The computer system 500 may also include one or more storage devices 525, representing remote, local, fixed, and/or removable storage devices and storage media for temporarily and/or more permanently containing computer-readable information. By way of example, storage device(s) 525 may be disk drives, optical storage devices, solid-state storage devices such as a random access memory ("RAM") and/or a read-only memory ("ROM"), which can be programmable, flash-updateable or the like.

The computer system 500 may additionally include a communications subsystems 535 (e.g., a modem, a network card—wireless or wired, an infra-red communication card—, a Bluetooth™ device, a near field communications (NFC) device, a cellular communication device, etc.). The communications subsystems him 535 may permit data to be exchanged with a network, system, computer, mobile device and/or other component as described earlier. The system 500 also includes working memory 530, which may include RAM and ROM devices as described above.

The computer system 500 may also comprise software elements, shown as being located within a working memory 530, including an operating system 540 and/or other code, such as applications 545. Software applications 545 may be used for implementing functions of various elements of the architecture as described herein. For example, software stored on and/or executed by a computer system, such as system 500, can be used in implementing the processes seen in FIGS. 3 and 4.

It should be appreciated that alternative embodiments of a computer system 500 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As examples, the ID confidence scoring system 120, multi-source data system 130, and entity resolution system 180 may each be implemented by a single system having one or more storage device and processing elements. As another example, the systems 120, 130 and 180 may each be implemented by plural systems, with their respective functions distributed across different systems either in one location or across a plurality of linked locations.

Moreover, while the various flows and processes described herein (e.g., those illustrated in FIGS. 3 and 4) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for evaluating identity information provided by an entity, comprising:
   storing, at a data system, a plurality of data records associated with a plurality of different entities, the data records originating from a plurality of data sources and including, for each of at least some of the originating data sources, both header data having identity data that identifies the associated entity and that is separate from behavioral data for the associated entity, and body data having non-identity data related to a condition associated with that entity;
   organizing, at an identity resolution system entity, a plurality of data node networks, each data node network comprising selected data records from data records stored at the data system, the selected data records each associated with one entity;
   receiving, from a requesting system, identity data provided for an entity in question, the identity data including at least two identity data elements that identify and are purported to be associated with the entity in question;
   accessing, by a scoring system, data records at the data storage system for the at least some of the originating data sources and related to the at least two identity data elements;
   determining, at the scoring system, a first component of an identity confidence score for the identity of the entity in question, the identity confidence score based on only the data elements of the header data of the accessed data records related to the at least two identity data elements, with the first component of the identity confidence score determined by:
      defining a first of the at least two identity data elements as a base element;
      defining a second of the at least two identity data elements as a link element;
      defining a functional relationship between the base element and the link element of the at least two identity data elements;
      evaluating the accessed data records to determine the occurrences of base elements and link elements having the functional relationship; and
      basing the first component of the identity confidence score on the determined occurrences;
   accessing, by the scoring system, a data node network associated with the entity in question;
   determining, at the scoring system, a second component of the identity confidence score for the identity of the entity in question, the second component of the identity confidence score based on analysis of the accessed data node network, wherein the second component of the identity confidence score is determined by:
      evaluating the plurality of data node networks stored at the data system in order to determine a predetermined likelihood of data node networks being associated with the entity in question;
      determining a matched one of the data node networks that has identity data with the closest match to the at least two identity data elements, based on the predetermined likelihood; and
      determining a score for the degree of match between the two identity data provided for the entity in question and the corresponding identity data in the matched one of the data node networks;
   combining the first component of the identity confidence score and the second component of the identity confidence score into a full identity confidence score; and
   providing from the scoring system, the full identity confidence score to the requesting system.

2. The method of claim 1, wherein determining the occurrences of base elements and link elements having the functional relationship comprises determining the number of times that the base element and the link element are both present in a single data record.

3. The method of claim 1, wherein determining the occurrences of base elements and link elements having the functional relationship comprises determining the number of times different link components are seen with the specified base component.

4. The method of claim 1, wherein determining the occurrence of base elements and link elements having the functional relationship comprises determining the number of times a specified base component is seen with a specified link component.

5. The method of claim 1, wherein determining, at the scoring system, an identity confidence score further comprises:
   establishing a matching framework score that reflects the degree to which the base element or the link element is similar to a corresponding data element in the accessed data records; and
   determining that the base element or link element matches the corresponding data element only if the base element and corresponding data element have a similarity that meets the established matching framework score.

6. The method of claim 5, wherein establishing a matching framework score is performed using a Levenshtein distance method.

7. The method of claim 1, further comprising:
   evaluating the plurality of data records stored at the data system in order to determine a predetermined likelihood of a group of data records being associated with a single entity; and
   organizing the group of data records in a data network associated with the single entity;
   wherein determining the identity confidence score for the identity of the entity in question further comprises determining the occurrence of at least one of the identity data elements in the group of data records in the data network associated with the single entity.

8. The method of claim 1, wherein the identity data provided by the entity in question is provided in an application to open an account at a bank.

9. The method of claim 1, wherein the plurality of data records is selected from a group comprising: (1) bank account status data, (2) bank account owner data, (3) bank account abuse data, (4) bank account fraud data, (5) bank internal fraud data, (6) descendent data, (7) incoming check return data, (8) outgoing check return data, (9) check deposit/payment inquiry data, (10) identity verification data, (11) stop payment data, (12) ACH transactions, (13) credit card owner data, (14) credit card account abuse data, and (15) credit card fraud data.

10. The method of claim 1, wherein the data records originating from the plurality of data sources are received at a data management system that is configured to arrange the received data records into the header data and the body data, with the header data having only identity data elements identifying the associated entity and with the body data having only non-identity data elements related to the associated entity.

11. The method of claim 1, wherein the one or more identity data elements are selected from a group comprising a name, a taxpayer identification number, a phone number, and addressed, and email address, a driver's license and a date of birth.

12. The method of claim 1, wherein the data records originating from the plurality of data sources have identity data and behavioral data that are configured by a data management system to have the identity data arranged in the header data and the behavioral data elements arranged in the body data.

13. The method of claim 1, wherein a data management system strips the plurality of data records of body data, with the data records stripped of the body data being stored at the data storage system.

14. A system for evaluating identity information provided by an entity, comprising:
  a data storage system for storing a plurality of data records associated with a plurality of different entities, the data records originating from a plurality of data sources and including, for each of at least some of the originating data sources, both header data having one or more identity data elements that identify the associated entity and that are separate from behavioral data for the associated entity, and a body data having one or more non-identity data elements related to the associated entity;
  one or more processors; and
  a memory, the memory storing instructions that are executable by the one or more processors and that configure the system to:
  organize, at an identity resolution system entity, a plurality of data node networks, each data node network comprising selected data records from data records stored at the data system, the selected data records each associated with one entity;
  receive, from a requesting system, identity data provided for an entity in question, the identity data including at least two identity data elements that identify and are purported to be associated with the entity in question;
  access, by a scoring system, data records at the data storage system for the at least some of the originating data sources having one or more data elements related to the at least two identity data elements;
  determine, at the scoring system, a first component of an identity confidence score for the identity of the entity in question, the identity confidence score based on only the identity data elements of the header data of the accessed data records related to the at least two identity data elements, with the first component of the identity confidence score determined by:
    defining a first of the at least two identity data elements as a base element;
    defining a second of the at least two identity data elements as a link element;
    defining a functional relationship between the base element and the link element of the at least two identity data elements;
    evaluating the accessed data records to determine the occurrences of base elements and link elements having the functional relationship; and
    basing the first component of identity confidence score on the determined occurrences;
  access, by the scoring system, a data node network associated with the entity in question;
  determine, at the scoring system, a second component of the identity confidence score for the identity of the entity in question, the second component of the identity confidence score based on analysis of the accessed data node network, wherein the second component of the identity confidence score is determined by:
    evaluating the plurality of data node networks stored at the data system in order to determine a predetermined likelihood of data node networks being associated with the entity in question;
    determining a matched one of the data node networks that has identity data with the closest match to the at least two identity data elements, based on the predetermined likelihood; and
    determining a score for the degree of match between the two identity data provided for the entity in question and the corresponding identity data in the matched one of the data node networks;
  combine the first component of the identity confidence score and the second component of the identity confidence score into a full identity confidence score; and
  provide, from the scoring system, the full identity confidence score to the requesting system.

15. The system of claim 14, wherein the instructions that are executable by the processor further configure the system to determine the occurrences of base elements and link elements having the functional relationship by:
  determining the number of times that the base element and the link element are both present in a single data record.

16. The system of claim 14, wherein the instructions that are executable by the processor further configure the system to determine the occurrences of base elements and link elements having the functional relationship by:
  determining the number of times different link components are seen with the specified base component.

17. The system of claim 14, wherein determining the occurrence of base elements and link elements having the functional relationship comprises determining the number of times a specified base component is seen with a specified link component.

18. The system of claim 14, wherein the instructions that are executable by the processor further configure the system to determine, at the scoring system, an identity confidence score by:
  establishing a matching framework score that reflects the degree to which the base element or the link element is similar to a corresponding data element in the accessed data records; and
  determining that the base element or link element matches the corresponding data element only if the base element and corresponding data element have a similarity that meets the established matching framework score.

19. The system of claim 18, wherein the instructions that are executable by the processor further configure the system to establish a matching framework score by using a Levenshtein distance method.

20. The system of claim 14, wherein the identity data provided by the entity in question is provided in an application to open an account at a bank.

* * * * *